T. W. Johnson,
Leaching App's.

No. 92,455. Patented July 13, 1869.

Witnesses
Ernest F. Kastenhuber
A. Kolee

Inventor
Thos W Johnson
pr
Van Santvoord & Hauff
Atty

United States Patent Office.

THOMAS W. JOHNSON, OF NEW YORK, N. Y.

*Letters Patent No. 92,455, dated July 13, 1869; antedated June 26, 1869.*

---

IMPROVED APPARATUS FOR CONCENTRATING EXTRACTS OF BARK AND OTHER LIQUIDS.

---

The Schedule referred to in these Letters Patent and making part of the same.

---

*To all whom it may concern:*

Be it known that I, THOMAS W. JOHNSON, of the city, county, and State of New York, have invented a new and improved Apparatus for Concentrating Liquid Extracts; and I do hereby declare the following to be a full, clear, and exact description thereof, which will enable those skilled in the art to make and use the same, reference being had to the accompanying drawing, forming part of this specification, in which drawing—

Similar letters indicate corresponding parts.

This invention consists in the arrangement of an open drum, composed of two or more disks, and a series of traverses, of wood, or other fibrous and absorbent material, in combination with a tank, which contains the liquid extract to be concentrated, and the ends of which form the bearings for the shaft of the open drum, in such a manner, that by imparting to the drum a revolving motion, the traverses act as agitators, whereby the liquid in the tank is stirred, and its concentration facilitated, and at the same time each traverse, in passing through the liquid, takes up a quantity thereof and carries the same round through the air, thereby spreading the same over an extensive evaporating-surface, and causing the more volatile parts thereof to evaporate with great rapidity.

The operation of concentrating the liquid extract may be still further facilitated by the application of heat.

Figure 1:
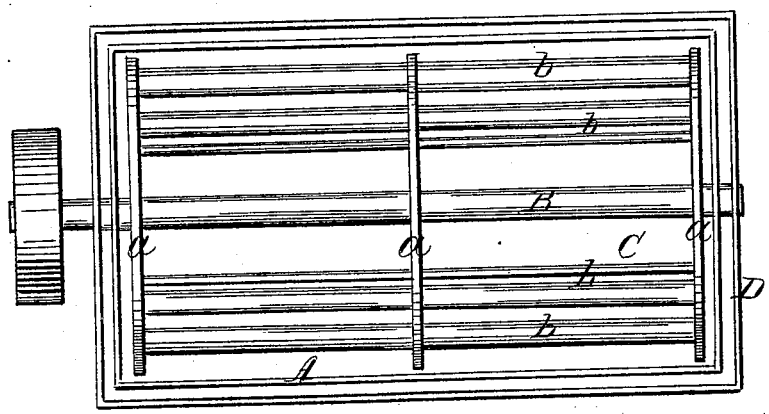
Figure 1 represents a plan or top view of this invention.
Figure 2:
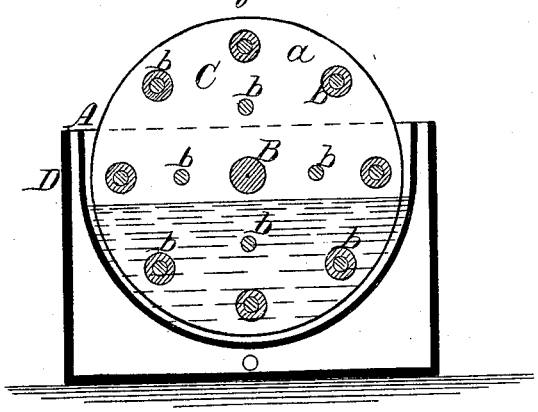
Figure 2 is a transverse section thereof.

A represents a tank, made of sheet-metal, or any other suitable material, in the form of a semi-cylinder, as clearly shown in fig. 2 of the drawing.

The ends of this tank form the bearings for the shaft B of an open drum, C, which is composed of two or more disks, $a$, and a series of traverses, $b$, as shown.

Said traverses are, by preference, made of wood, or any other fibrous or absorbent material, such as rope, or they may be made of metal covered with felt, or of any other absorbent material.

The liquid extract to be concentrated is introduced into the tank A, and by imparting to the open drum C a revolving motion, the traverses $b$ are caused to pass through the liquid, so as to constantly agitate the same, and at the same time each traverse, on rising from the liquid, carries up a quantity thereof, and spreads the same over an extensive surface, so that the volatile parts of said liquid are caused to evaporate with rapidity.

By the combined action of the agitation and of the evaporation, as described, the concentration of the liquid extracts can be effected in a short time, even if the liquid is cold. But the effect of my apparatus can be still further increased by heating the liquid extract in the tank A. For this purpose I propose to surround said tank with a steam-jacket, D, as shown, or the heat may be applied in any other desirable manner.

I am aware that a series of perforated disks has been used, for the purpose of evaporating cane-juice, as shown in the patent of Henry Bessemer, March 8, 1853, and such disks have also been used for condensing vapors and gases, as shown in the patent of A. T. W. Partz, June 2, 1857, but the action of my open drum is different from that of said disks, since the disks simply serve to spread the liquor over a large evaporating-surface without producing any perceptible agitation, while, by my traverses, the liquid is agitated and constantly brought in contact with fresh quantities of air, whereby the evaporation or concentration is materially facilitated; and furthermore, by using a large number of traverses in the drum, a very extensive evaporating-surface is obtained, and a concentrator is produced which enables me to effect the concentration of a liquid extract with great ease and rapidity.

Having thus described my invention,

What I claim as new, and desire to secure by Letters Patent, is—

The open drum C, constructed of disks $a$ and traverses $b$, in combination with the tank A, substantially as shown and described.

THOS. W. JOHNSON.

Witnesses:
W. HAUFF,
E. F. KASTENHUBER.